United States Patent [19]
Bongiovanni

[11] 3,817,218
[45] June 18, 1974

[54] DOG CHOKE COLLAR
[76] Inventor: Carl G. Bongiovanni, 1717 Crystal Ln., Mount Prospect, Ill. 60056
[22] Filed: Jan. 18, 1973
[21] Appl. No.: 324,847

[52] U.S. Cl. ............................................. 119/106
[51] Int. Cl. ........................................ A01k 27/00
[58] Field of Search ................................. 119/106

[56] References Cited
UNITED STATES PATENTS
| | | | |
|---|---|---|---|
| 649,026 | 5/1900 | Wood | 119/106 |
| 2,616,394 | 11/1952 | Elsinger | 119/106 |
| 2,798,458 | 7/1957 | Odermatt | 119/106 |

*Primary Examiner*—Hugh R. Chamblee
*Attorney, Agent, or Firm*—Darbo, Robertson & Vandenburgh

[57] ABSTRACT

In the improved dog choke collar, the chain is covered by a tube of tough plastic or plastic-like material to avoid contact by the chain with the dog's neck and thus eliminate the cause of damage to the hair and skin on the neck of the dog and, at the same time, improve the operation of the collar.

1 Claim, 4 Drawing Figures

PATENTED JUN 18 1974　　　　　　　　　　　　　3,817,218

DOG CHOKE COLLAR

BACKGROUND AND SUMMARY OF THE INVENTION

Choke collars are commonly used to control dogs, especially larger dogs, that are inclined to strain unduly at their leashes and/or may impulsively pull on their leashes with such force as to tax and possibly exceed the ability of the handler to hold on to the dog. Under some motivating circumstances, large dogs may place such strain upon the ordinary leather collar and leash that one or the other is broken and the dog escapes.

The choke collar restrains such dogs by actually choking off breathing to a degree proportional to the magnitude of the strain imposed by the dog upon the leash and collar. The choke collar comprises a relatively strong chain to one end of which the leash is attached while the other end, after forming the neck-encircling noose, is attached to a ring which can slide along the chain with the result that as the dog pulls, the noose is increasingly reduced in size to increasingly impede the ability of the dog to breathe. The choking pressure is eased as the dog reduces its pull.

It has been found that the relatively severe rubbing of the choke collar chain on the neck of the dog breaks off and pulls out hairs and otherwise damages the skin and coat of the dog.

The principal purpose of the invention is to provide a dog choke collar that does not appreciably damage the skin or coat of the dog in the region of the neck. A further object is to provide such a leash which operates more smoothly in response to the pull exerted by the dog.

DESCRIPTION OF SPECIFIC EMBODIMENT

Figure 1:
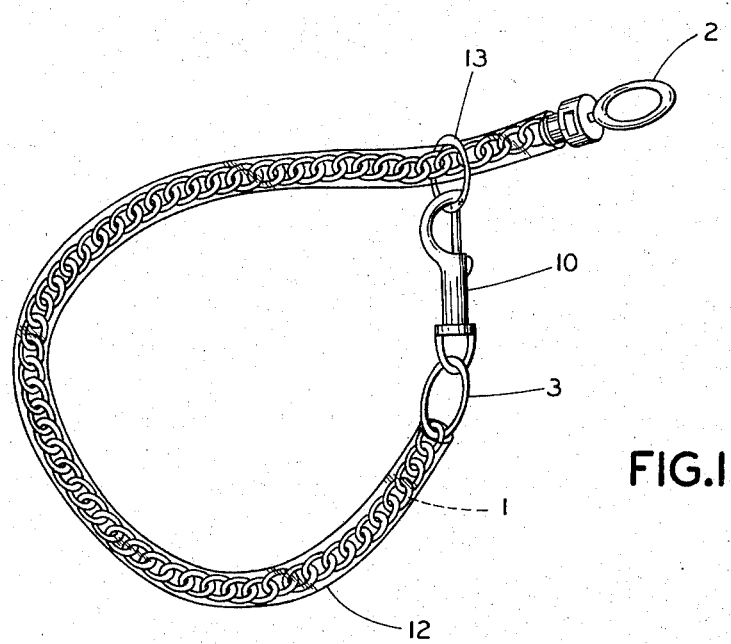
FIG. 1 is a perspective view of the improved dog choke collar showing the arrangement of the noose.
Figure 2:
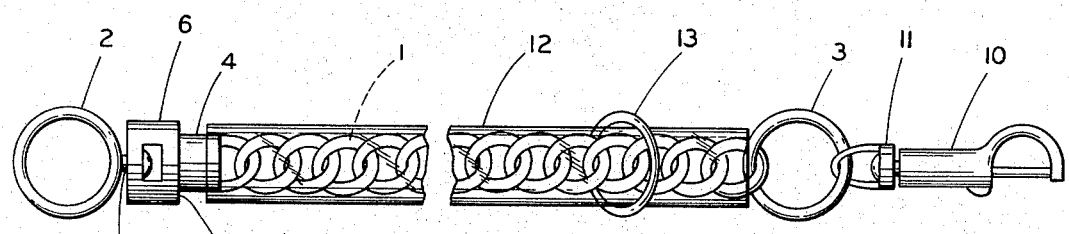
FIG. 2 is a side view of the collar.
Figure 3:
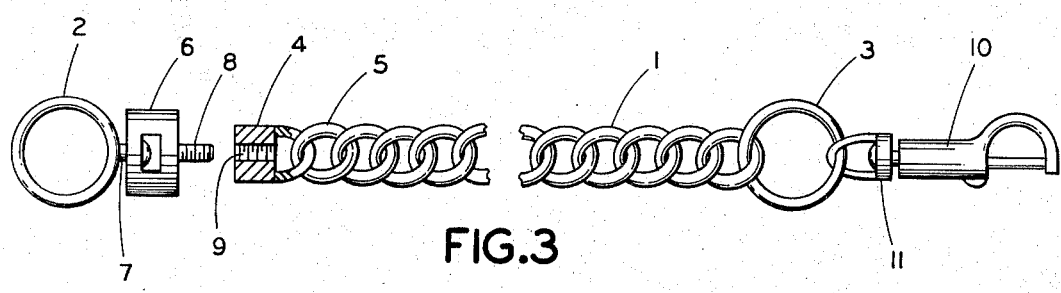
FIG. 3 is a side view of the collar partly disassembled and without the tubular sheath for the chain and, FIG. 4 is a side view of the plastic tube.
Figure 4:
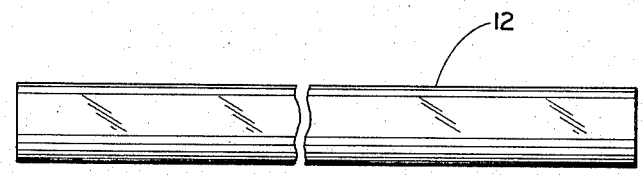

As is shown in FIGS. 1 – 3 of the drawing, the noose-forming chain 1 has connection fittings including rings 2 and 3 at the respective ends of the chain. Ring 2, by which the leash is fastened to the collar, is connected with the end link of the chain by means of a swivel joint with a two part fitting as is most clearly illustrated in FIG. 3. Part 4 is permanently interconnected with the link 5 and part 6, to which ring 2 is connected by swivel joint 7, is demountably fastened to part 4 by means of the threaded stud 8 which screws into the correspondingly threaded bore 9 of part 4.

Ring 3 may be permanently interconnected with the other end of the chain. A latch hook 10 is affixed to ring 3 through swivel joint 11.

In accordance with the invention, chain 1 of the choke collar is sheathed throughout its length by a tough, flexible tube 12. This tube may be made of a suitable plastic material, such as polyethylene or similar plastic or plastic-like material. The tube must be resistant to wear imposed by the movement of free ring 13 as it slides along the tube in the operation of the choke collar. Preferably, an inherently slippery plastic material is employed to enhance the smooth movement of ring 13 along its surface responsive to the strain imposed upon the leash and collar by the pull of the dog.

Tube 12 is large enough in diameter to easily accomodate the chain therein and its walls are thick enough to provide reasonable length of useful life. The lateral dimensions of part 4 is no greater than that of the chain and the tube may conveniently be assembled upon the chain by holding the tube in vertical position and lowering the chain, before connection of ring 2 thereto, down into the tube and then screwing part 6 of the connecting fitting into part 4. The shoulder 14 provided by the end of part 6 serves as a stop to limit movement of the tube as does ring 3 at the other end of the chain. The tube may be replaced when it wears out by unscrewing part 6 from part 4.

In use, a sufficiently strong leash is fastened to ring 2 and the opposite end is carried around the neck of the dog and snapped onto ring 13. As the dog pulls against the restraint of the leash, ring 13 slides along the tube 12, tightening the noose upon the neck of the dog to effect the choking action calculated to keep the dog under control.

I claim:

1. A dog choke collar comprising a chain having connection fittings at each end thereof, a tough flexible tube sheathing said chain throughout the length thereof, a ring arranged upon and encircling said tube with freedom to slide along the length thereof, one of the chain end connection fittings comprising a ring and a two-part fitting, the first part of said two-part fitting being no larger in lateral dimension than said chain and permanently fastened to the end link thereof, the second part of said two-part fitting being larger in lateral dimension than said chain and permanently fastened to said last-mentioned ring, said first part and said second part being demountably fastened together whereby said chain with said first part thereon may pass through said tube in assembling said collar and said connection fitting and thereafter fastened together to hold said tube in position on said chain.

* * * * *